Figure 2:
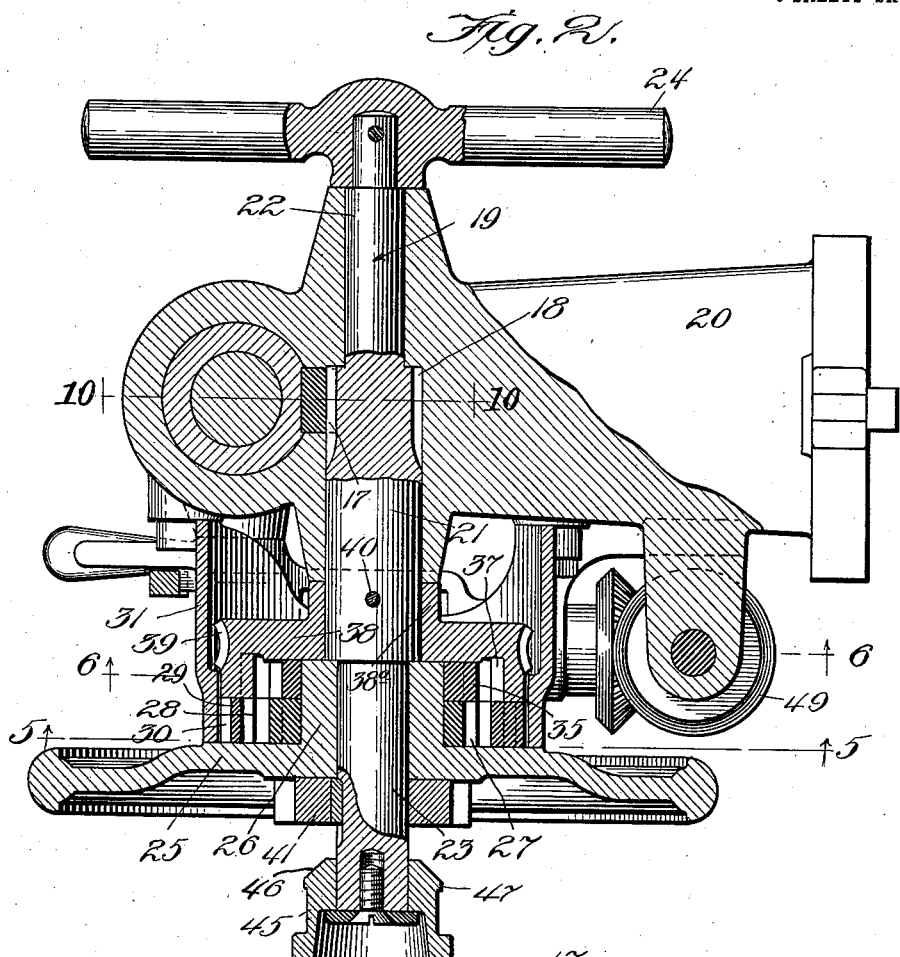

R. MILNE.
FEEDING ATTACHMENT FOR DRILL SPINDLES.
APPLICATION FILED JAN. 3, 1911.
1,026,595.
Patented May 14, 1912.
6 SHEETS—SHEET 1.
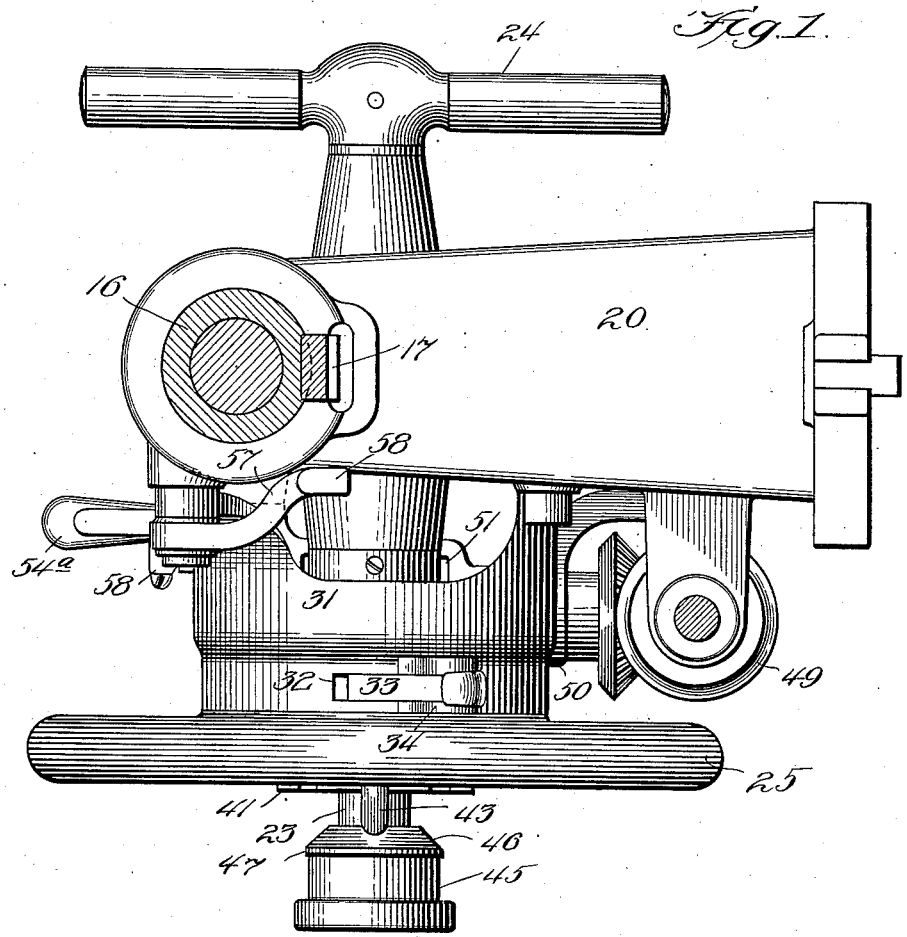
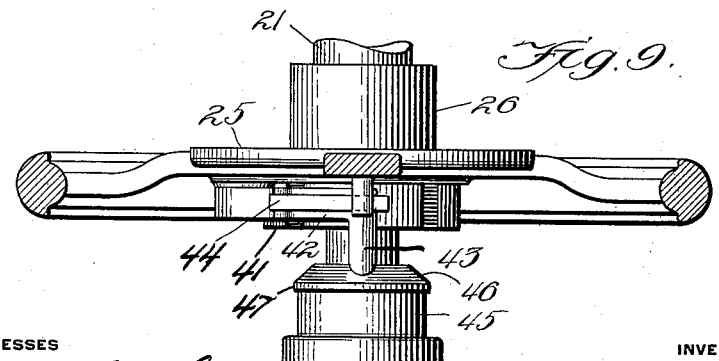

R. MILNE.
FEEDING ATTACHMENT FOR DRILL SPINDLES.
APPLICATION FILED JAN. 3, 1911.

1,026,595.

Patented May 14, 1912.

6 SHEETS—SHEET 2.

WITNESSES
Harry S. Gaither
Wm. P. Bond

INVENTOR
Robert Milne
by Banning & Banning
attys

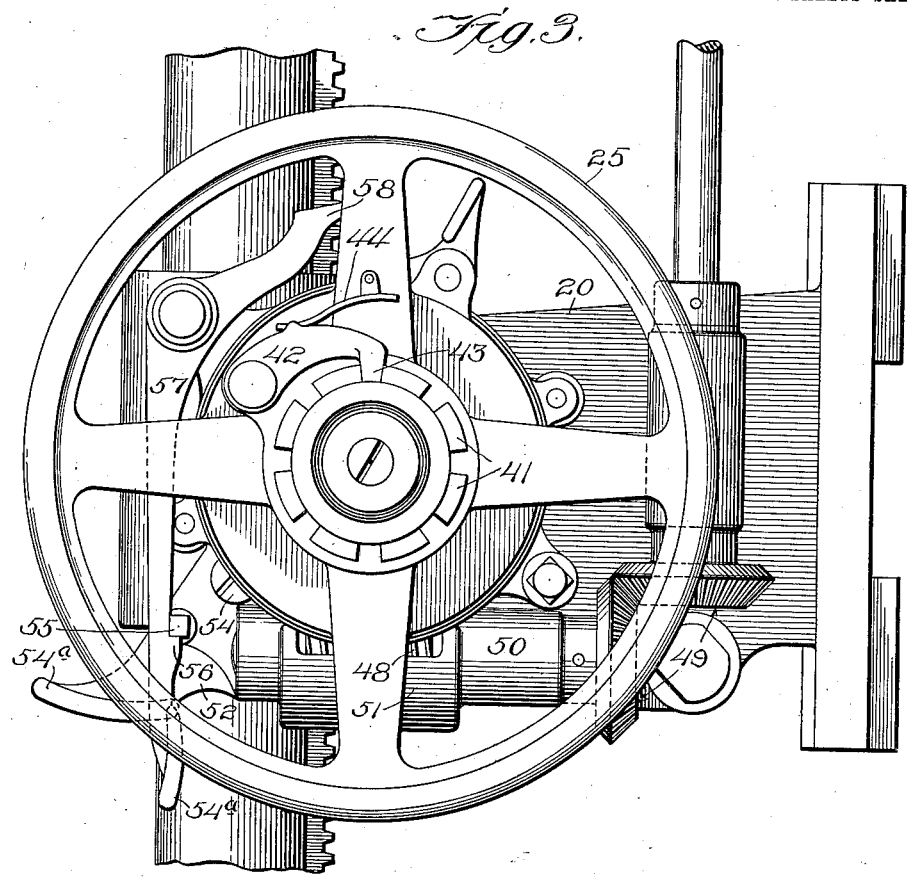
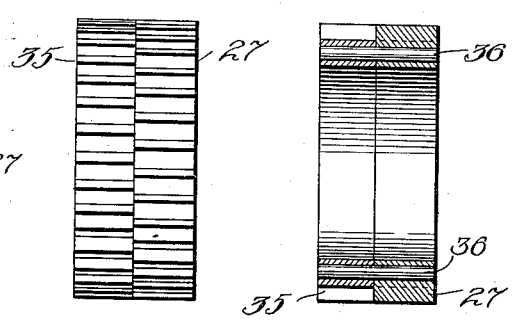

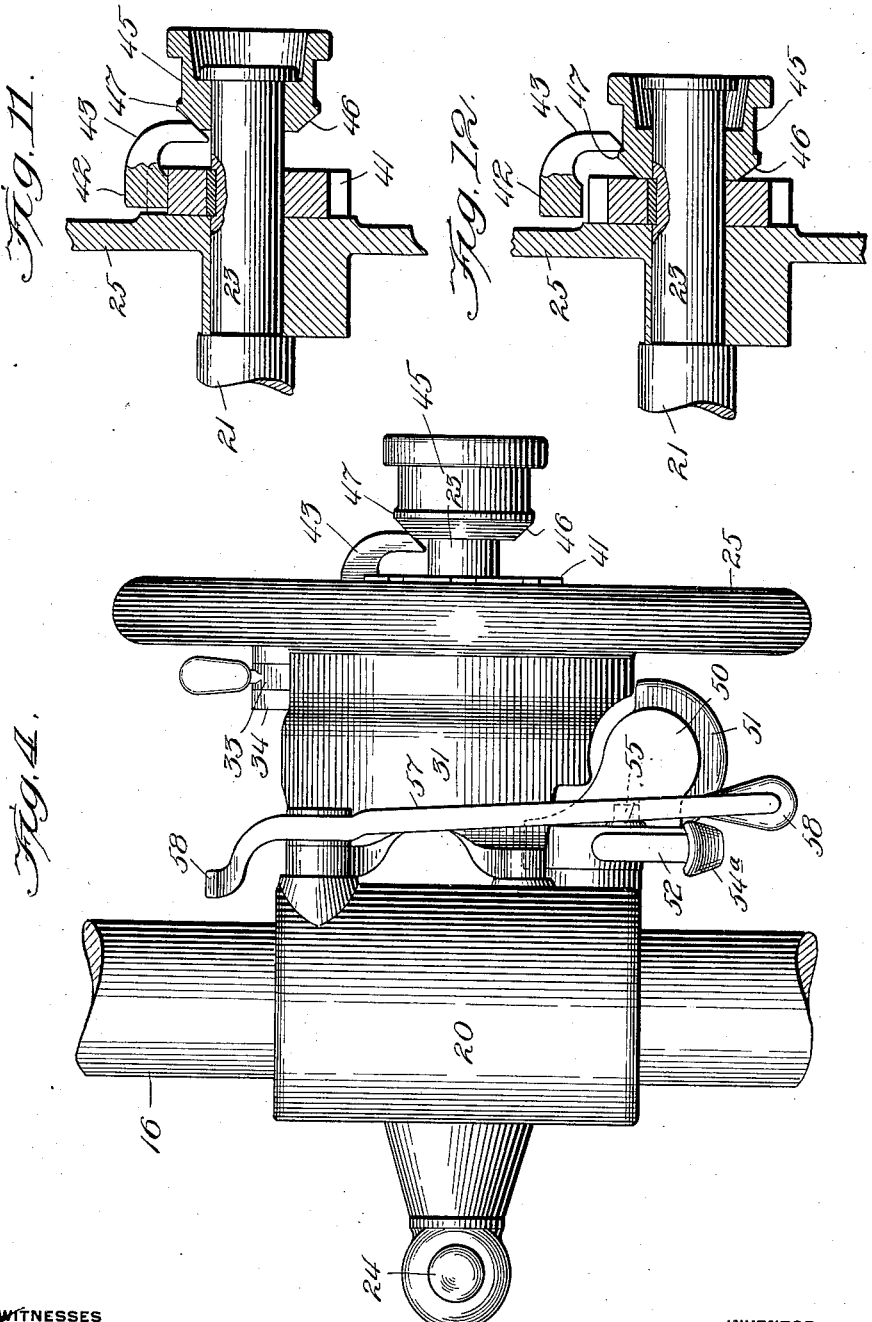

R. MILNE.
FEEDING ATTACHMENT FOR DRILL SPINDLES.
APPLICATION FILED JAN. 3, 1911.
1,026,595.
Patented May 14, 1912.
6 SHEETS—SHEET 5.
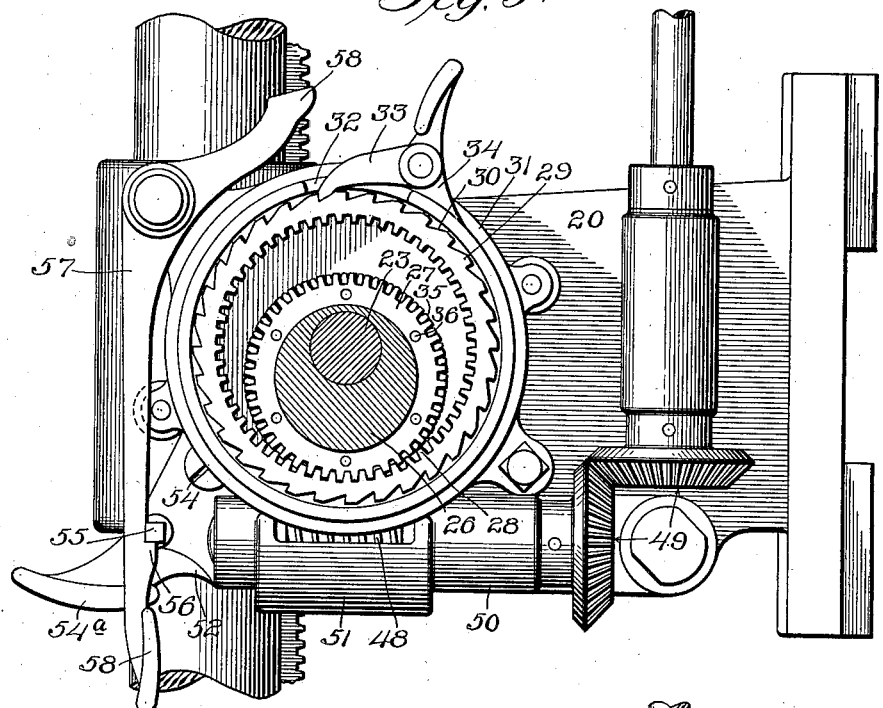
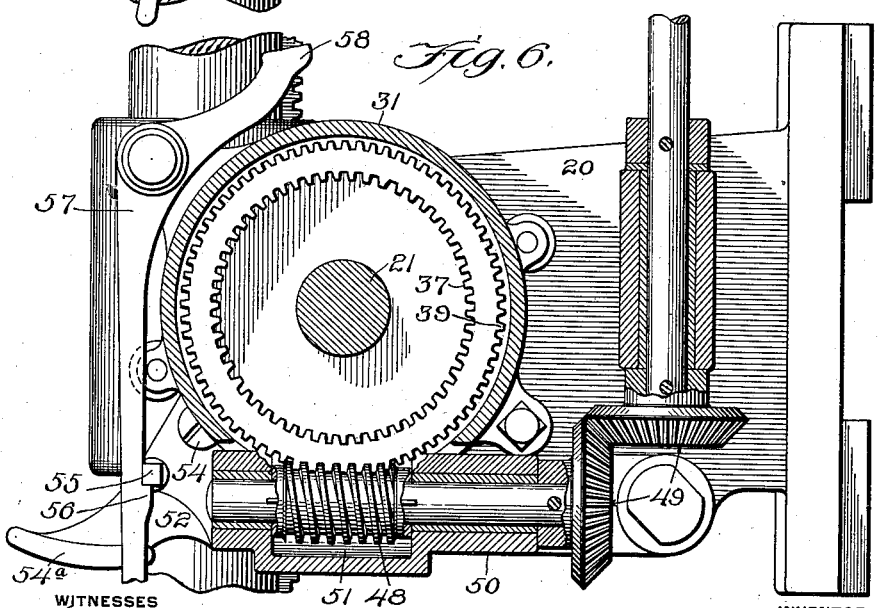

R. MILNE.
FEEDING ATTACHMENT FOR DRILL SPINDLES.
APPLICATION FILED JAN. 3, 1911.
1,026,595.
Patented May 14, 1912.
6 SHEETS—SHEET 6.
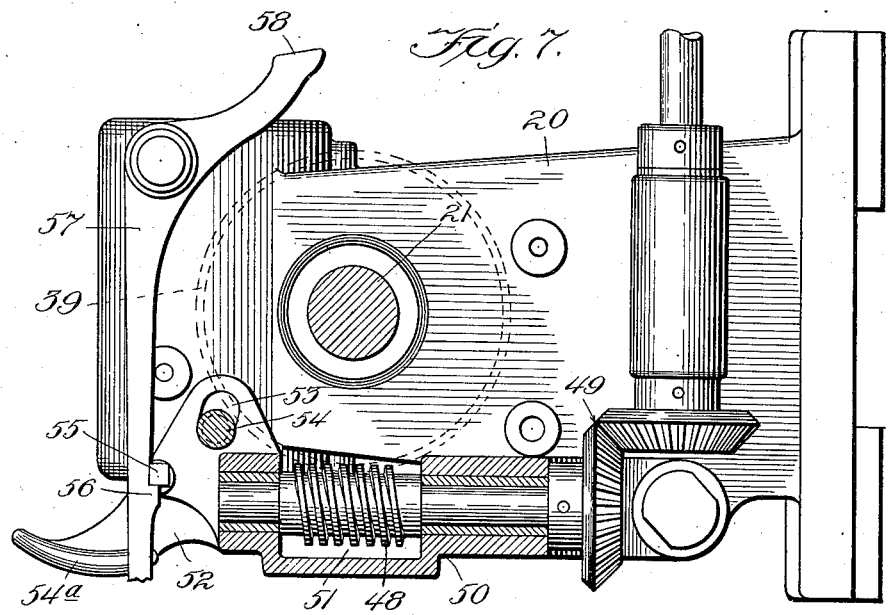
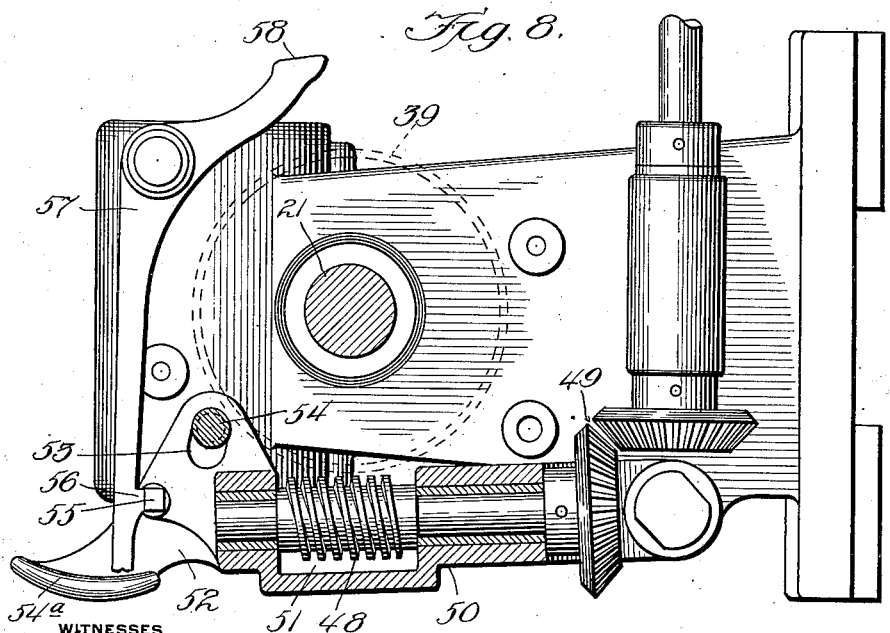

UNITED STATES PATENT OFFICE.

ROBERT MILNE, OF ROCKFORD, ILLINOIS, ASSIGNOR TO ROCKFORD DRILLING MACHINE CO., OF ROCKFORD, ILLINOIS, A CORPORATION OF ILLINOIS.

FEEDING ATTACHMENT FOR DRILL-SPINDLES.

1,026,595. Specification of Letters Patent. Patented May 14, 1912.

Application filed January 3, 1911. Serial No. 600,551.

*To all whom it may concern:*

Be it known that I, ROBERT MILNE, a citizen of the United States, residing at Rockford, in the county of Winnebago and State of Illinois, have invented certain new and useful Improvements in Feeding Attachments for Drill-Spindles, of which the following is a specification.

The present invention relates more particularly to the mechanism for feeding the drill by the hand of the operator, as is desirable when the work is faced, and in certain kinds of heavy and light drilling.

One object of the present invention is to assemble the mechanisms entering into the hand feeding of the drill spindle so that they are all within convenient reach of the operator and can, if desired, be operated entirely by one hand.

Other objects of the invention are, to provide means for effecting a quick return movement of the drill spindle out of the work; to provide a leverage member to be grasped by the operator in actuating the mechanism for feeding the spindle by hand, which leverage member will be of a large and substantial nature, whereby sufficient leverage can be obtained to easily and efficiently perform the various drilling operations intended; to provide a gear connection between the leverage member and the shaft which moves the drill spindle, so that an increased degree of leverage is obtained upon the shaft, and hence an increased force applied to the spindle; to provide means for throwing this gear connection out of operation when desired; and to provide means for throwing and releasing the leverage member into and out of clutch with the shaft, whereby the shaft may be driven directly by the leverage member.

Further objects of the invention are, to arrange the driving worm gear below the driven worm gear, thus utilizing the force of gravity to move the driving worm gear out of mesh with the driven worm, and to enable a reservoir for lubricant to be provided, in which the driving worm gear will run; and to provide a trip mechanism which is within handy reach of the operator actuating the leverage member, which trip mechanism is for the purpose of releasing the driving worm gear to allow it to be thrown out of mesh with the driven worm gear.

The invention further consists in the features of construction and the combination of parts hereinafter described and claimed.

Figure 10:
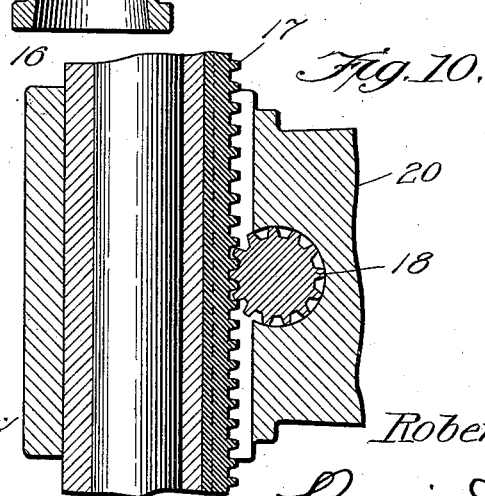

In the drawings, Figure 1 is a plan view of the mechanism of the present invention; Fig. 2, a view similar to Fig. 1, showing certain portions of the mechanism in section; Fig. 3, a face view of the mechanism of the present invention; Fig. 4, a plan view looking upon the reverse side of the mechanism shown in Figs. 1 and 2; Fig. 5, a section on line 5—5 of Fig. 2, looking in the direction of the arrow; Fig. 6, a section on line 6—6 of Fig. 2, looking in the direction of the arrow; Fig. 7, a face view showing the driving worm in mesh with the driven worm, and showing the construction and arrangement of the parts for supporting the driving worm and the mechanism for releasing the driving worm from the driven worm; Fig. 8, a view similar to Fig. 7, showing the driving worm released from engaging position with the driven worm; Fig. 9, a detail of the leverage member and the mechanism for clutching the leverage member to the shaft for raising and lowering the drill spindle; Fig. 10, a detail on line 10—10 of Fig. 2 showing the rack and pinion arrangement for raising and lowering the drill spindle; Fig. 11, a detail showing in operative position the mechanism for clutching the leverage member to the shaft; Fig. 12, a view similar to Fig. 11, showing the mechanism in non-operative position; Fig. 13, a detail of the pinion which is actuated by the leverage member and which meshes with the internal gears; Fig. 14, an edge view of the parts shown in Fig. 13; and Fig. 15, a sectional view of the parts shown in Fig. 13.

In the operation of drilling machines, it is frequently found desirable, and, in fact, necessary, to raise and lower the drill spindle by a manually operated means actuated by the hand of the operator. This is because of the fact that the power operated means are oftentimes not sufficiently within the control of the operator to enable him to stop and to start the movements of the drill spindle with enough accuracy. Heretofore in the construction of drill presses, so far as I am aware, this feeding by hand of the drill spindle has been a laborious and complicated operation, by reason of the fact that in order to accomplish it, it was necessary to throw certain levers in different positions, which required several movements of the hand of the operator; and it has been found inconvenient, or impractical, to arrange the different members necessary to perform this manually operated feed in such correlation to one another as to enable them to be easily and quickly manipulated by the operator.

In the prior art, so far as I am aware, the leverage member grasped by the operator in actuating the hand feed has been of a relatively small nature, so that it was not of the nature required to enable the hand feed to be used under all of the circumstances which would arise, and, in fact, I believe that the hand feed of the drill presses of the prior art have almost entirely been utilized for the purpose of facing the work, as sufficient leverage could not be obtained by them to render practical, heavy drilling by this means. In all of the mechanisms for performing this work, so far as I am aware, the variety of parts and their necessary correlation to one another required a plurality of small fittings and fine adjustments, in order to secure them to the body of the machine, and consequently the danger of frequent disarrangement increased by such construction.

It is the object of the present invention to obviate the objections above recited and to increase the efficiency of operation of this portion of the drill press, and such result is brought about by an arrangement of mechanism as follows: The mechanism of the present invention is applied to a drill press frame of any ordinary standard type of construction. The parts entering into the composition of the drill press frame structure are not shown in the present instance, nor is the mechanism for rotating the spindle, inasmuch as the construction and arrangement of this portion of the drill does not enter in any way into or affect the operation of the parts of the present invention. The only parts illustrated at this time are the mechanisms for manually feeding the drill spindle, a portion of the drill spindle, and the gears for actuating the driving worm.

The mechanism of the present invention is positioned in proper correlation to a drill spindle 16 of any ordinary and well known type, which is provided, as usual, with a rack surface 17. Meshing with the rack surface 17 is a pinioned surface 18, secured to and carried by a stub shaft or stem 19. The shaft 19 is journaled within a block or casting 20, through which the drill spindle extends; and said shaft is composed of a somewhat enlarged central portion 21, extending out from which are reduced portions 22 and 23. The end portion 22 has affixed thereto, by suitable means, a handle or grip 24 of the ordinary and well known type generally employed upon drilling machines for manually feeding the drill spindle, and is usually employed for the purpose of effecting a quick return of the drill spindle. The end 23 of the shaft 19 has loosely mounted thereon a leverage member 25, which, in the form shown, is in the nature of a relatively large hand wheel. The hand wheel is provided with a hub 26, which, as best shown in Fig. 5, is mounted upon the end portion 23 in eccentric relation thereto; and the hub 26 has loosely mounted thereon a ring gear 27, which is concentric to said hub and hence eccentric to the end 23 of the shaft 19.

The ring gear 27 meshes with an internal gear 28 formed on the interior of a ring 29; and the outer periphery of the ring 29 is formed with a series of ratchet teeth 30. This ring 29, it is understood, is essentially an idle ring and is not normally connected in any manner to the shaft 19. The ring is held in position and guided in its rotative movements through the medium of a housing 31, which is more clearly shown in Fig. 2, and is suitably arranged and constructed to be attached to the casting 20. The housing 31 is provided with a slot or opening 32, through which extends a dog 33, which is pivotally mounted upon a lug 34 formed on the housing 31. The dog 33 acts as a lock to prevent rotative movement of the ring 29, the function and reason for which will be brought out more clearly hereinafter.

The ring gear 27 is adapted to be secured to a ring gear 35 by means of pins 36, more clearly shown in Fig. 15, or other suitable connecting means. The gears 35 and 27 are in direct alinement with one another and are lying side by side; but, as more clearly shown in Fig. 14, it is deemed expedient to arrange the teeth of these two gears so that they are staggered to one another. This has been found to give an easier movement to the gears than when the teeth are arranged in direct alinement with one another. The gear 35 meshes with an internal gear 37, best shown in Figs. 2 and 6. The internal gears 28 and 37 are preferably formed with an uneven number of teeth, the gear 37 having one more tooth than the gear 28. This is in order to provide for a relative movement between the ring gear 27 with the internal gear 37. The internal gear 37 is formed integral with a ring-like member 38, provided with a hub 38ª; and on the outer periphery of the member 38 is formed a worm gear 39, which will hereinafter be termed the driven worm gear of the feed mechanism. The member 38 is secured to the central portion of the shaft 19 by a pin 40 passing through the hub, or by other suitable locking means.

Keyed to the end of the shaft 19 is a ring-shaped toothed member 41, which, as shown more clearly in Figs. 2 and 3, is lying in close proximity to the hand wheel 25. Pivotally secured to the hand wheel 25 is a dog-like member 42 provided with an offset fingered end 43, adapted to engage with the toothed member 41. The dog-like member is normally held to maintain its fingered end 43 in engagement with one of the recesses of the member 41 by a spring 44 attached to the hand wheel. Means are provided, however, which are best shown in Figs. 11 and 12, for maintaining the dog-like member out of operative position. Said means consist of a knob 45, which is slidably mounted upon the end 23 of the shaft 19, and is provided with a beveled face 46, terminating in a bead 47. As will be seen from a study of Figs. 11 aand 12, when the knob is slid inward upon the end 23 of the shaft 19, the beveled surface 46 will act to force the fingered end of the dog 42 out of engagement with the recesses in the member 41 and so break the connection between the hand wheel and the member 41.

From the foregoing description, it will be seen that there are two methods provided for connecting the hand wheel 25 to the shaft 19. The first is through the medium of the eccentrically mounted gear rings and the internal gears. This method is utilized for heavy drilling or facing, where a substantial leverage is necessary to force the drill through the work. Its operation is as follows: The dog 33 is thrown into engagement with the ratchet teeth on the outer periphery of the ring 29, as shown in Fig. 5. The hand wheel is then revolved, which revolution, of course, revolves the hub 26, since these parts are integral or connected in some way with one another. As heretofore stated, the hub 26 is eccentric to the center of the shaft 19, hence, as said hub is revolved around the center of this shaft, it will carry with it the gear ring 27. Although this ring is not keyed or secured in any way to the hub, but is carried along simply because of the eccentric mounting of the hub, and because of the concentric position of the ring to the hub, there is no other movement possible for the ring with respect to the center of the shaft 19 except to follow the hub in its circular movement about the center of said shaft.

The gear 27 is meshing with the teeth of the internal gear 28 of the ring 29, and as shown in the drawings, meshes in a manner so that it forms in effect a planetary gear. As heretofore stated, this ring 29 is held against revolution through the engagement of the dog; hence, as the ring 29 passes over the toothed surface of the internal gear 28, said gear 27 will be revolved about the center of the hub 26. This is because of the fact that the gear 27 is loose about the hub 26 and is traveling over the surface of a fixed gear. Through the rotation of the gear 27, a movement will be imparted to the gear 35, which movement will be about the center of the shaft 19 and also about the center of the hub 26. It is understood that the rotation of the gear 27 will be in a reverse direction from the rotation of the hand wheel 25.

The movement imparted to the gear 35 will rotate the ring-like member 38, owing to the engagement of the teeth of the gear 35 with the internal gear 37. The member 38 is fixed to the shaft 19 by the pin 40, as heretofore stated. Hence, a revolution of this member will rotate the shaft 19 and actuate the pinion 18, which operates upon the rack 17 and acts to lower the drill spindle. When the dog 33 is thrown out of engagement and the hand wheel revolved, the gears 27 and 35 will be carried around by the rotation of the hub 26 and will be revolved in a reverse direction from the rotation of the wheel, movement being imparted to the gears by their riding over the teeth of the gear ring 37, which is fixed. This imparts movement to the ring 29 in a reverse direction from the rotation of the hand wheel, but no movement is imparted to the shaft 19 by the operation of the hand wheel during the time the dog 33 is out of engaging position with the teeth 30 of the ring 29. Exactly the reverse conditions are brought about by the throwing of the dog out of engaging position than when said dog is in engaged position. In the disengaged position, the gear 27 and the ring 29 will revolve in a reverse direction from the rotation of the hand wheel, and the gear 35 will revolve about the center of the hub 26, by reason of its travel over the teeth of the internal gear 37; but no movement will be imparted to the gear 37, because of the fact that there is no resisting surface presented for the gear 27 to engage with, the ring 29 being entirely loose and revolving in unison with the pinions.

When the dog 33 is out of engaging position with the teeth 30, the handle 24 may be used by the operator to give a quick return to the drill spindle. When the handle 24 is used, it, of course, imparts motion directly to the shaft 19. This will turn the member 28 and will cause the gears 27 and 35 to be revolved therewith; but such revolution will be solely about the hub 26 as an axis, a revolution of the hub 26 will take place around the shaft 19; and no movement of these gears about the center of the hub 26 will take place at this time. The gear ring 37, the gears 35 and 27, and the ring 29 will all rotate in unison; and the hand wheel 25 will accordingly be stationary with respect to these parts. When the handle 24 is to be used for a quick return of the drill spindle, it will be necessary to throw the dog 33 out of engagement in order to use this handle, since the ring 29 would be rotated in a direction, when the drill spindle is returned, to have the dog 33 lock with the teeth 30 of said ring and a stopping of the ring would result. But by throwing the dog 33 out of engagement, the handle 24 can then be used for a quick return movement, since for this kind of work, sufficient leverage can be obtained by the handle to accomplish this result.

The leverage obtained when the ring gears and internal gears are operating to rotate the shaft 19 is relatively great. A relatively light leverage can be obtained by using the handle 24 in the manner previously described, or by connecting the hand wheel 25 to the shaft. This latter connection is made by throwing in the dog-like member 42 so that its fingered end 43 engages one of the recesses in the member 41, thus locking the hand wheel and this member together; and since the member 41 is keyed to the shaft 19, a revolution of the hand wheel will impart motion directly to the shaft. The hub 26 will be revolved, and this will revolve the gears 27 and 35 about the center of the shaft 19 simultaneously with the hand wheel. The ring 29 will be revolved in a reverse direction by this movement and the dog 33 will ride over the teeth 30. Although a rotative action will be imparted to the gears, as heretofore described, there will be no rotative movement imparted to the shaft 19 by the rotation of these gears; but a rotation will be imparted to the shaft directly by the hand wheel 25, and, as heretofore stated, since this hand wheel is of a substantial diameter, a good and efficient leverage can be obtained by the use of said wheel, which will serve to feed the drill through medium heavy work, or during the facing operation.

Meshing with the driven worm 39 is a driving worm 48, which is driven by suitable miter gears 49. The gear 48 is housed within a swinging bracket 50, best shown in Fig. 6; and the housing is formed to provide a well 51, in which the gear 48 travels, and said well is adapted to contain a lubricant for the purpose of keeping the gear 48 in a constantly lubricated condition. This is made possible in the present construction, owing to the fact that the parts are so arranged as to enable the driving worm to be located below the driven worm, in place of at the side.

The bracket 50 is provided with a plate 52, provided with a slot 53, into which is entered a pin 54. The relation of the pin to the slot, as more clearly shown in Figs. 7 and 8, is such as to allow of movement of the lug with respect to the pin. The lug terminates in a finger piece 54$^a$; and the plate is further provided with a protuberance 55, which is adapted to be engaged by a hook 56 formed on a swinging arm 57. The swinging arm, as shown, may be provided with a finger piece 58 at either end thereof, so that the same may be within handy reach of the operator, without his removing his grasp from the hand wheel 25.

The operation of the portion of the device just described is as follows: When the arm 57 is swung to release the catch from engagement with the protuberance 55, the swinging bracket 50 will fall by gravity until the pin 54 strikes the end wall of the slot 53, when the movement of the parts will be checked and they will remain in the position shown in Fig. 8. To restore the parts to normal position, the operator merely presses up on the finger piece 54$^a$, which shoves the swinging bracket into the position shown in Fig. 7.

From the foregoing description, it will be seen that a hand controlled movement can be imparted to the spindle through the rotation of the hand wheel, which, if a great leverage is desired, as is the case in facing or in heavy drilling, it can be had by the arrangement of the internal gears and the planetary gears meshing therewith. If a feed requiring a lighter degree of leverage is required, the spindle can be fed by connecting the hand wheel directly to the shaft which operates the spindle. This latter will, of course, be a quicker movement than the former; and if but slight leverage is necessary, will perform the work. Thus light or heavy hand drilling can be accomplished without any rearrangement of the mechanism and without moving a large assortment of lever or analogous devices.

I claim:

1. In a device of the class described, the combination of a drill spindle, a rack on said spindle, a shaft provided with a pinion meshing with said rack, an internal gear fixed on said shaft, an internal gear loose on said shaft, said internal gears having a different number of teeth, a hand wheel provided with a hub loosely mounted eccentrically on said shaft, ring gears loosely mounted on said hub and joined to rotate in unison and meshing with said internal gears, a series of ratchet teeth upon the outer periphery of the loose internal gear, and a dog held against movement with respect to said gears and adapted to be thrown into and out of engagement with said ratchet teeth, substantially as described.

2. In a device of the class described, the combination with a drill spindle, a rack on said spindle, a shaft provided with a pinion meshing with said rack, a hand wheel loose on said shaft, a planetary gear connection between the hand wheel and shaft, means for making and breaking said gear connection between the hand wheel and shaft, a toothed member secured to said shaft, and a dog carried by the hand wheel adapted to be thrown into engagement with said toothed member, whereby the shaft may be driven directly by the hand wheel when the connection between the hand wheel and planetary gear is broken, substantially as described.

3. In a device of the class described, the combination of a drill spindle, a rack on said spindle, a shaft provided with a pinion meshing with said rack, a hand wheel loose on said shaft, a planetary gear connection between the hand wheel and shaft, means for making and breaking said gear connection between the hand wheel and shaft, a toothed member secured to said shaft, a dog carried by the hand wheel adapted to be thrown into engagement with said toothed member, whereby the shaft may be driven directly by the hand wheel when the connection between the hand wheel and planetary gear is broken, and a shiftable member for moving and holding said dog out of engagement with said toothed member, substantially as described.

4. In a device of the class described, the combination of a drill spindle, a rack on said spindle, a shaft provided with a pinion meshing with said rack, an internal gear loose on said shaft, an internal gear fast to said shaft, said internal gears having a different number of teeth, a hand wheel loose on said shaft, pinions rotated by said hand wheel traveling eccentrically with respect to said internal gears and located to move in unison, means for making and breaking the driving connection between the pinions and the internal gears, a toothed member secured to said shaft, and a dog carried by the hand wheel adapted to be thrown into engagement with said toothed member, whereby said shaft is driven directly by the hand wheel when the connection between the shaft and internal gears is broken, substantially as described.

5. In a device of the class described, the combination of a drill spindle, a rack on said spindle, a shaft provided with a pinion meshing with said rack, an internal gear loose on said shaft, an internal gear fast to said shaft, said internal gears having a different number of teeth, a hand wheel loose on said shaft, pinions rotated by said hand wheel traveling eccentrically with respect to said internal gears and located to move in unison, means for making and breaking the driving connection between the pinions and the internal gears, a toothed member secured to said shaft, a dog carried by the hand wheel adapted to be thrown into engagement with said toothed member, whereby said shaft is driven directly by the hand wheel when the connection between the shaft and internal gears is broken, and a shiftable member for moving and holding said dog out of engagement with said toothed member, substantially as described.

6. In a device of the class described, the combination of a drill spindle, a rack on said spindle, a shaft provided with a pinion meshing with said rack, an internal gear fixed to said shaft, an internal gear loose on said shaft, said internal gears having an unequal number of teeth, means for locking and unlocking the loose gear of said internal gears, pinions loose upon the shaft and located to rotate in unison with one another meshing with said internal gears, a hand wheel loose upon the shaft for rotating said pinions, a toothed wheel keyed to the shaft, and a dog carried by the hand wheel adapted to be thrown into engagement with said toothed wheel, whereby the shaft may be revolved directly by the hand wheel when the loose internal gear is unlocked, substantially as described.

7. In a device of the class described, the combination of a drill spindle, a rack on said spindle, a shaft provided with a pinion meshing with said rack, an internal gear fixed to said shaft, an internal gear loose on said shaft, said internal gears having an unequal number of teeth, means for locking and unlocking the loose gear of said internal gears, pinions loose upon the shaft and located to rotate in unison with one another meshing with said internal gears, a hand wheel loose upon the shaft for rotating said pinions, a toothed wheel keyed to the shaft, a dog carried by the hand wheel adapted to be thrown into engagement with said toothed wheel, whereby the shaft may be revolved directly by the hand wheel when the loose internal gear is unlocked, and a shiftable member for moving and holding said dog out of engagement with said toothed member, substantially as described.

8. In a device of the class described, the combination of a drill spindle, a rack on said spindle, a shaft provided with a pinion meshing with said rack, a hand wheel loose on said shaft, a planetary gear connection between said hand wheel and shaft, including internal gears, means for making and breaking said gear connection between the hand wheel and the shaft, means for locking said hand wheel to said shaft, whereby said shaft may be revolved directly by said hand wheel when the connection between the internal gears and hand wheel is broken, and a shiftable cam faced member for moving and holding said hand wheel locking means out of operative position, substantially as described.

ROBERT MILNE.

Witnesses:
WM. P. BOND,
MARY R. FROST.

Copies of this patent may be obtained for five cents each, by addressing the "Commissioner of Patents. Washington, D. C."